July 14, 1931.  W. E. SYKES  1,814,348
MACHINE FOR CUTTING GEAR TEETH
Filed Jan. 31, 1927   10 Sheets-Sheet 1

Inventor
William E. Sykes
By Henry E. Rockwell
Attorney

July 14, 1931. W. E. SYKES 1,814,348
MACHINE FOR CUTTING GEAR TEETH
Filed Jan. 31, 1927 10 Sheets-Sheet 2

Inventor
William E. Sykes
By Henry E. Rockwell
Attorney

July 14, 1931. W. E. SYKES 1,814,348
MACHINE FOR CUTTING GEAR TEETH
Filed Jan. 31, 1927 10 Sheets-Sheet 3

Inventor
William E. Sykes
By Henry E. Rockwell
Attorney

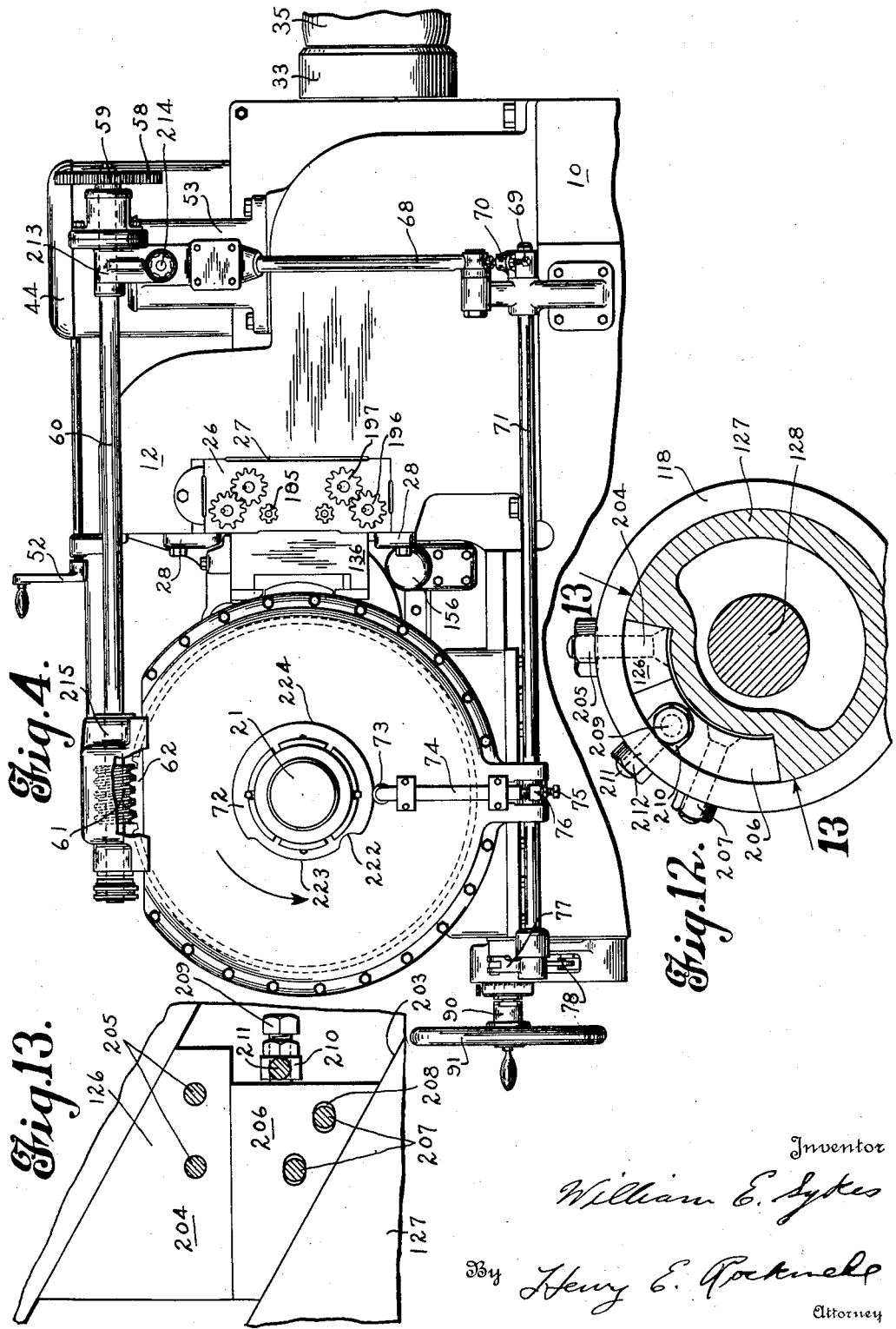

July 14, 1931.  W. E. SYKES  1,814,348
MACHINE FOR CUTTING GEAR TEETH
Filed Jan. 31, 1927  10 Sheets-Sheet 6
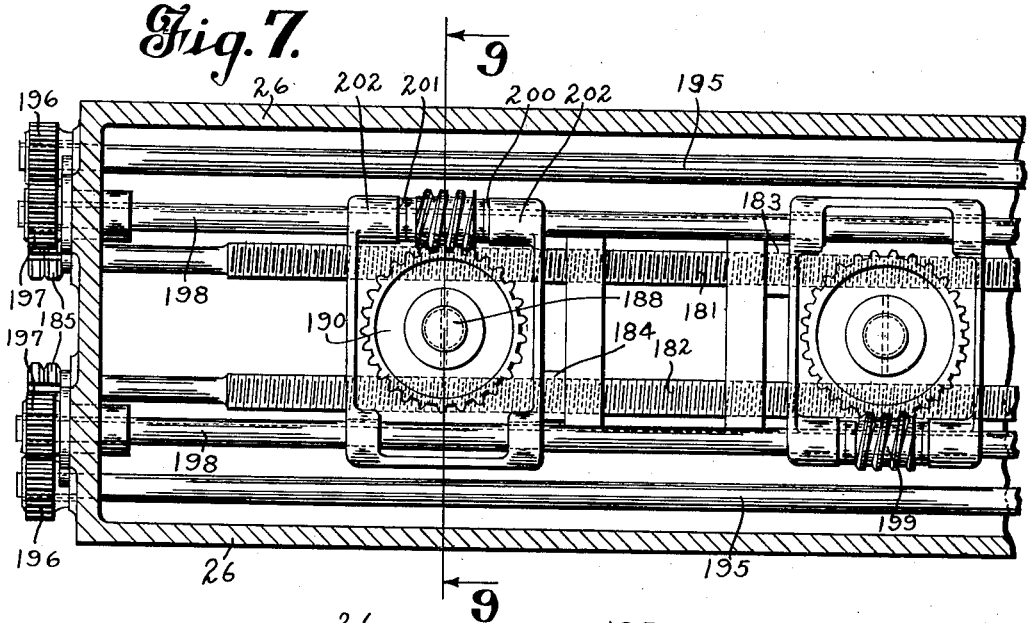
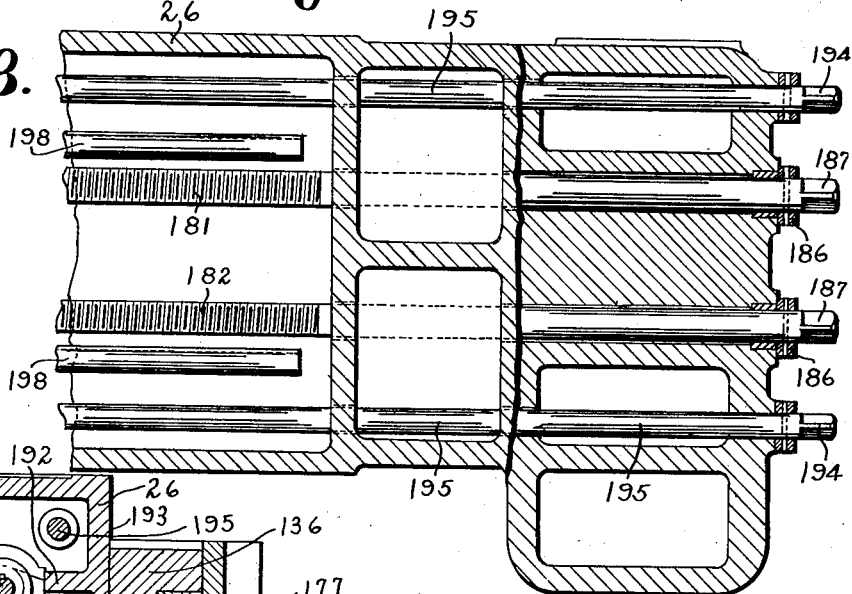
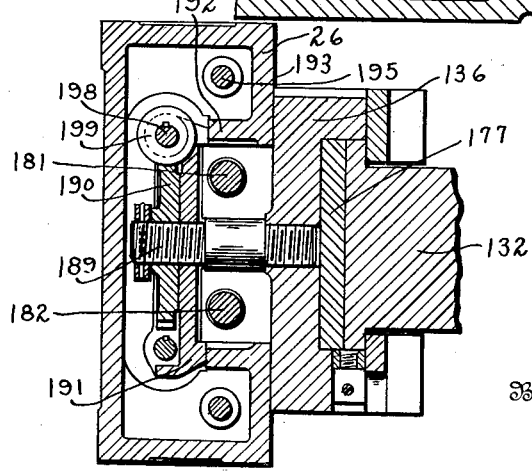
Inventor
William E Sykes
By Henry E Rockwell
Attorney

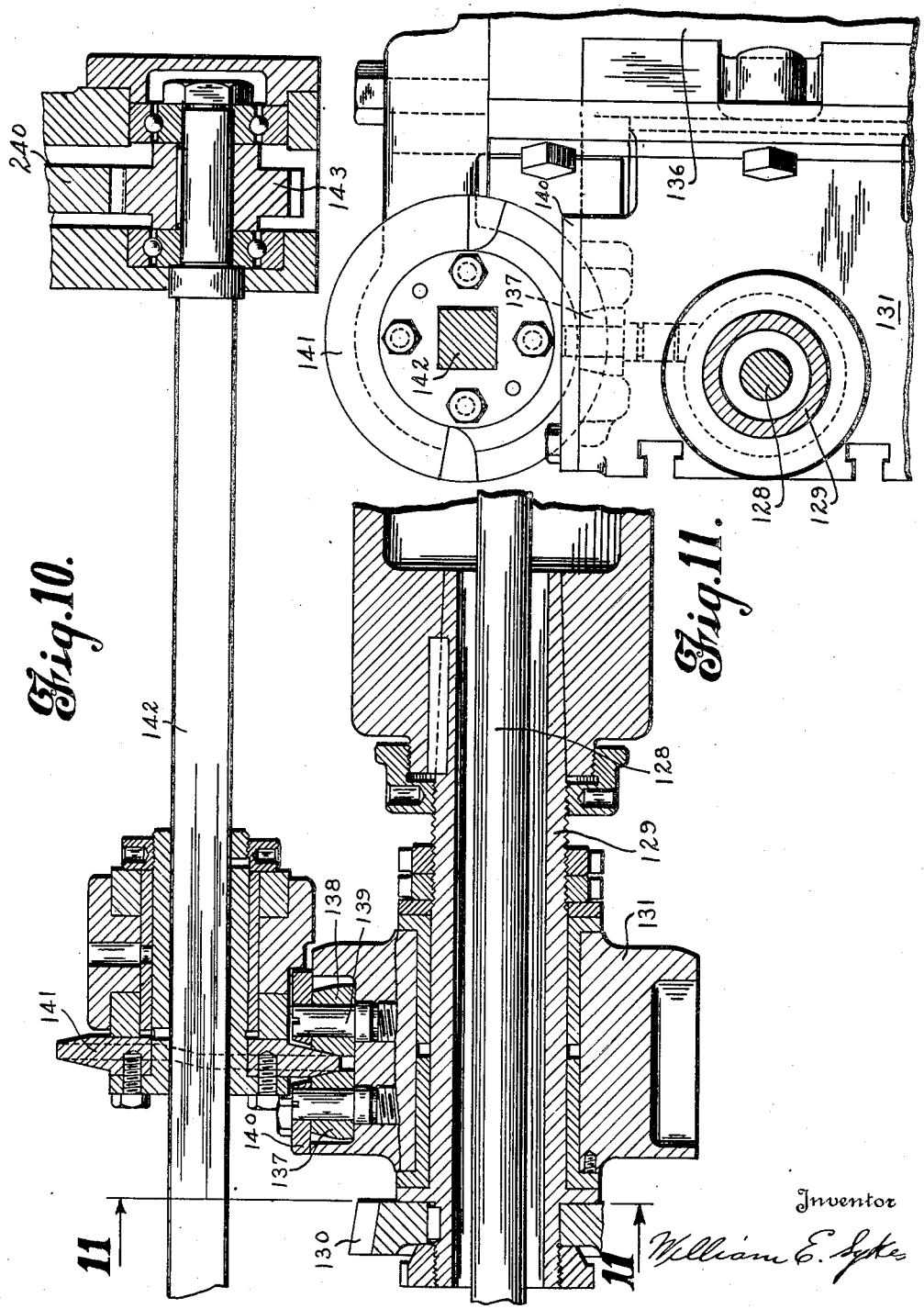

July 14, 1931.  W. E. SYKES  1,814,348
MACHINE FOR CUTTING GEAR TEETH
Filed Jan. 31, 1927   10 Sheets-Sheet 8

Inventor
William E. Sykes
By Henry E. Rockwell
Attorney

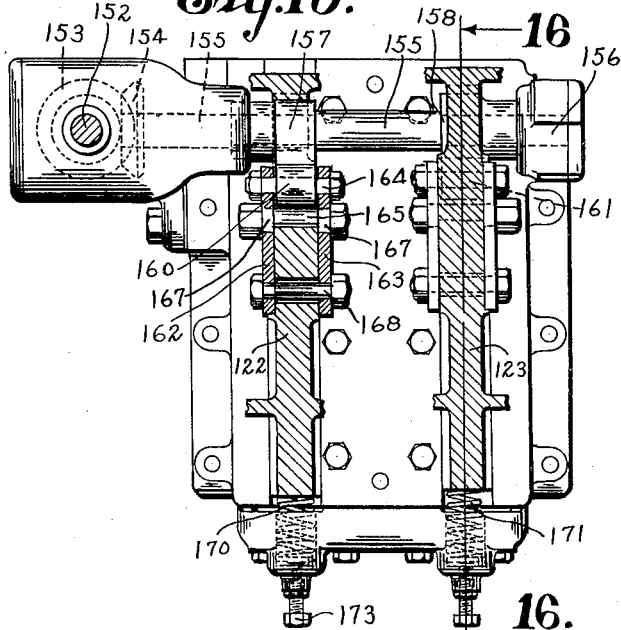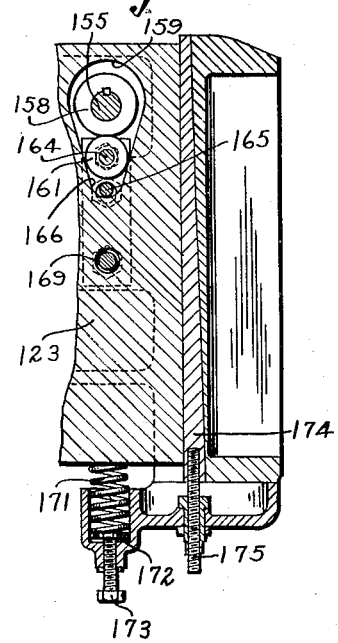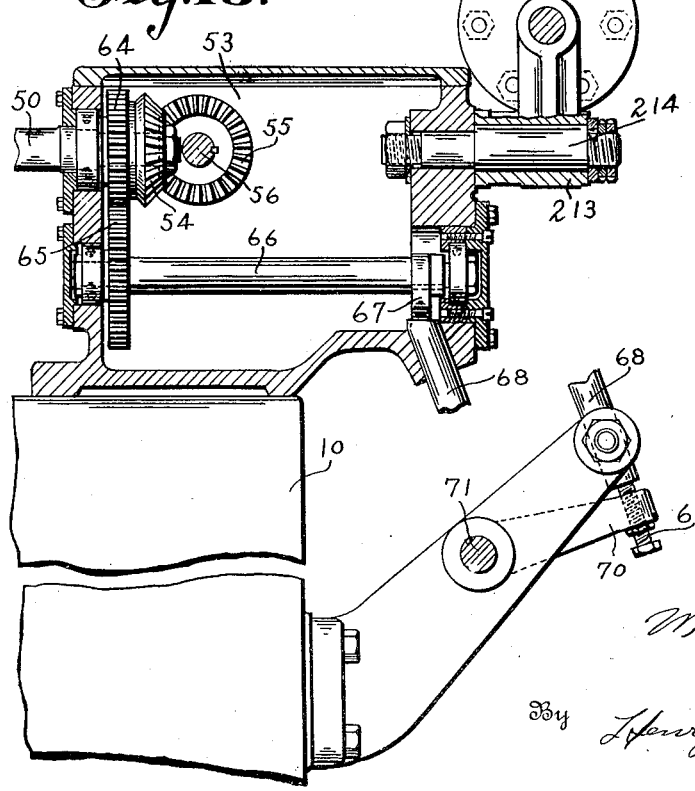

July 14, 1931.  W. E. SYKES  1,814,348
MACHINE FOR CUTTING GEAR TEETH
Filed Jan. 31, 1927  10 Sheets-Sheet 10
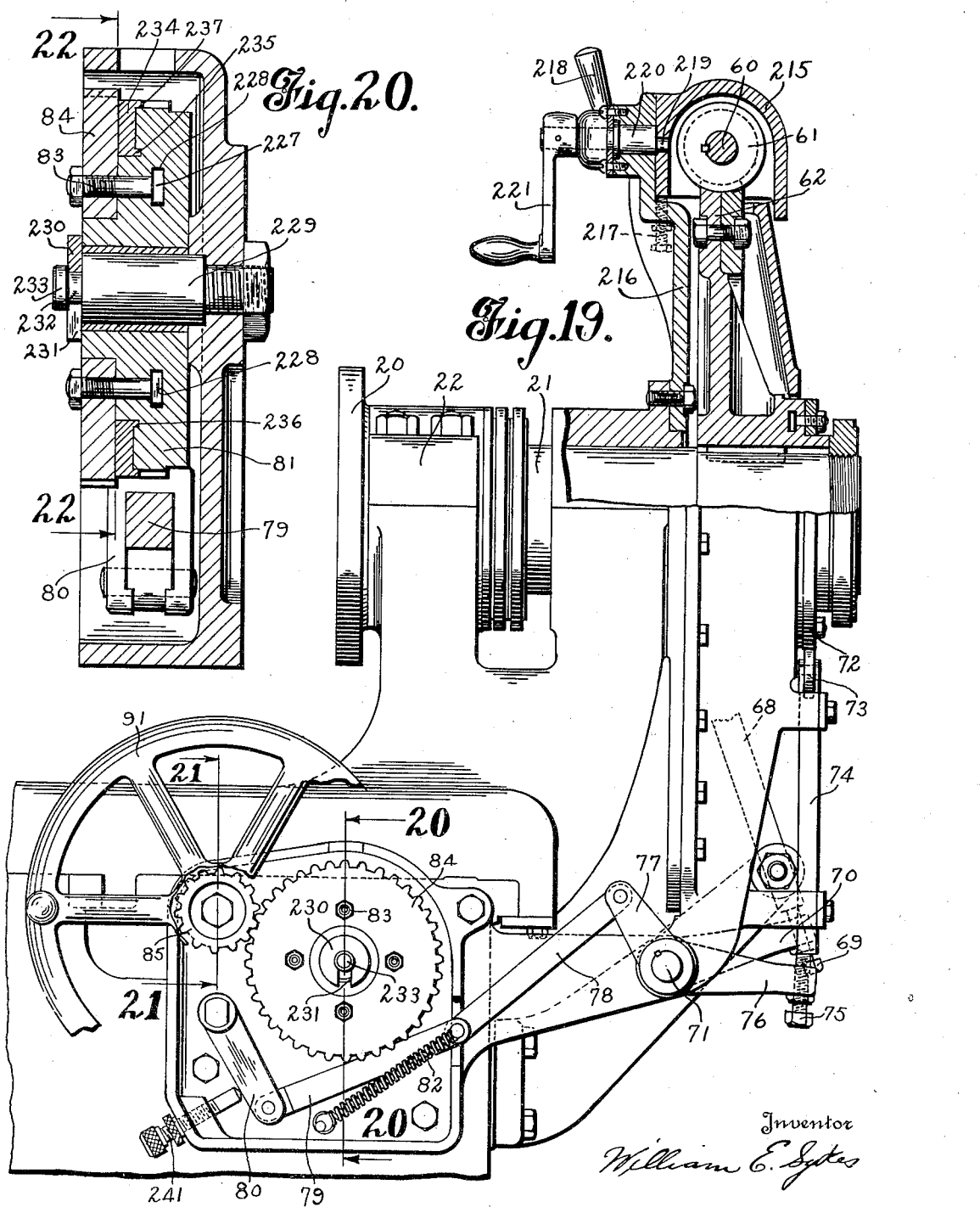

Patented July 14, 1931

1,814,348

UNITED STATES PATENT OFFICE

WILLIAM E. SYKES, OF BUFFALO, NEW YORK

MACHINE FOR CUTTING GEAR TEETH

Application filed January 31, 1927. Serial No. 164,825.

This invention relates to improvements in machines for forming the teeth of gears, and while the invention comprises certain features which will be found advantageous in cutting straight toothed gears, such as spur gears and pinions for example, it is more particularly concerned with a machine for the cutting of helical or double helical teeth upon a gear blank, in which one or more cutters are moved across the face of the gear blank during the cutting operation. The cutters are given, besides this reciprocatory movement across the face of the blank, a helical or twisting movement when cutting helical teeth, a bodily relieving movement to enable them to clear the work during their inoperative strokes, and to both cutters and work is imparted a continuous generating feeding movement to present the entire surface of the blank to the cutters.

The present application deals particularly with improvements in machines of the general type shown in my Patent No. 1,750,030, dated March 11, 1930, and is concerned with certain features of construction designed to improve the operation of machines of this character. The invention also seeks to improve in certain respects the power transmitting means to the various parts of the machine and the controlling devices by which the transmission of power may be controlled.

One object of my invention is the provision of means for imparting a substantially automatic relative approaching movement to the cutters and blank, so that the blank may be properly fed up to the cutters at the beginning and during the cutting operation.

Another object of my invention is to provide improved means for relieving the cutters from the work during their return or inoperative movement.

A still further object of my invention is to provide improved retaining means to hold the cutters holders upon the reciprocating carriage.

A still further object of my invention is to provide adjusting means for the cutter twisting means to take up possible wear and to obtain a correct bearing thereof.

Further, the invention contemplates simplifying generally the operation of machines of this character, and providing a combination of mechanisms which will be comparatively economical to manufacture and especially efficient in use.

To these and other ends the invention consists of the novel features and combinations of parts to be hereinafter described and claimed.

In the accompanying drawings:

Fig. 4 is a right hand side view of part of the machine;

Fig. 7 is a sectional view on line 7—7 of Fig. 6;

Fig. 8 is a sectional view on line 8—8 of Fig. 5;

Fig. 9 is a sectional view on line 9—9 of Fig. 7;

Fig. 10 is a sectional view on line 10—10 of Fig. 1;

Fig. 11 is a sectional view on line 11—11 of Fig. 10;

Fig. 12 is a sectional view on line 12—12 of Fig. 5;

Fig. 13 is a sectional view on line 13—13 of Fig. 12;

Fig. 15 is a sectional view on line 15—15 of Fig. 14;

Fig. 16 is a sectional view on line 16—16 of Fig. 15;

Fig. 18 is a sectional view on line 18—18 of Fig. 1;

Fig. 19 is an enlarged front elevation of the feed mechanism, with certain parts in section on line 19—19 of Fig. 1;

Fig. 20 is a section on line 20—20 of Fig. 19;

Figure 1:
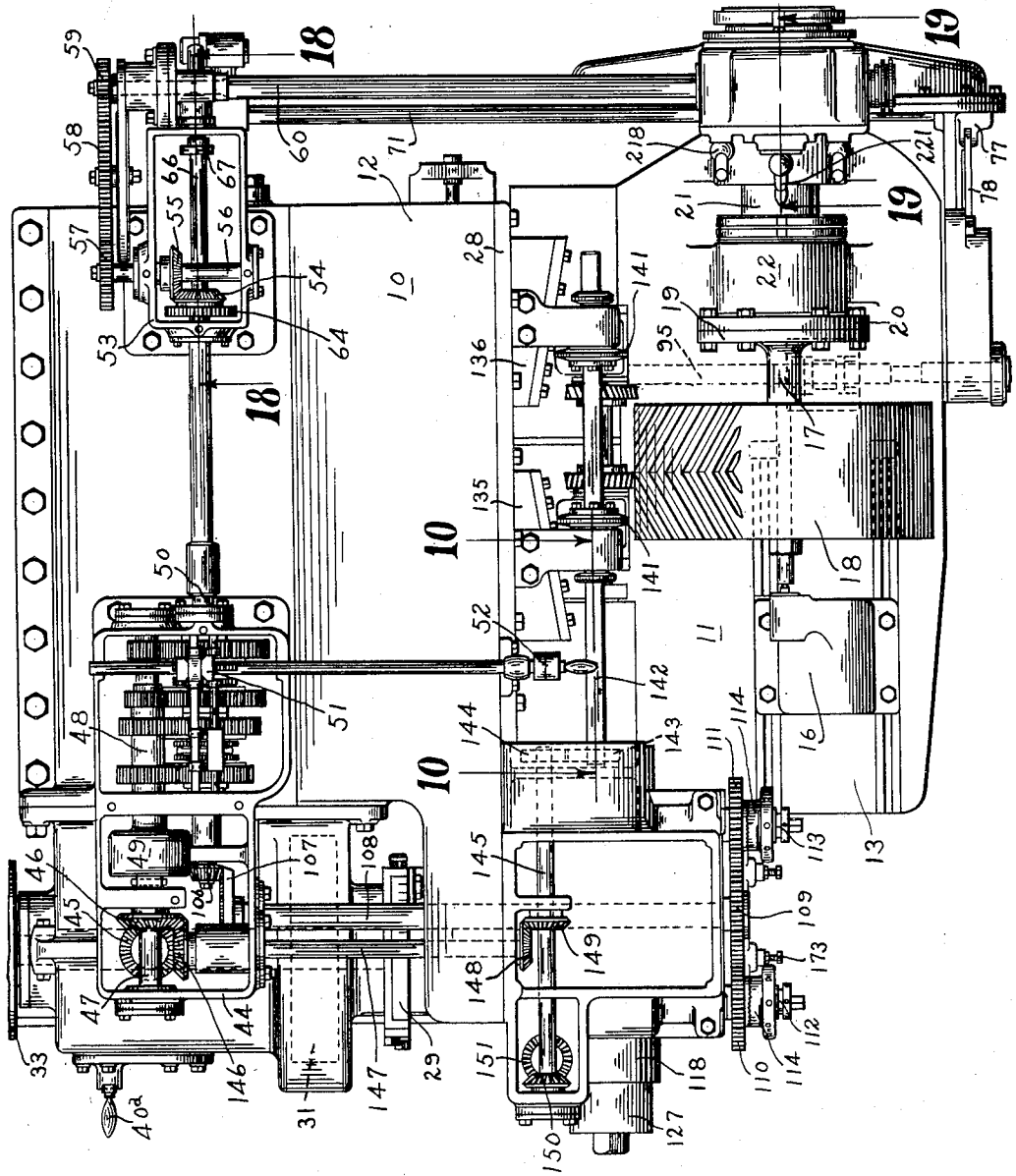
Fig. 1 is a plan view of a gear cutting machine, embodying the features and improvements of my invention.
Figure 2:
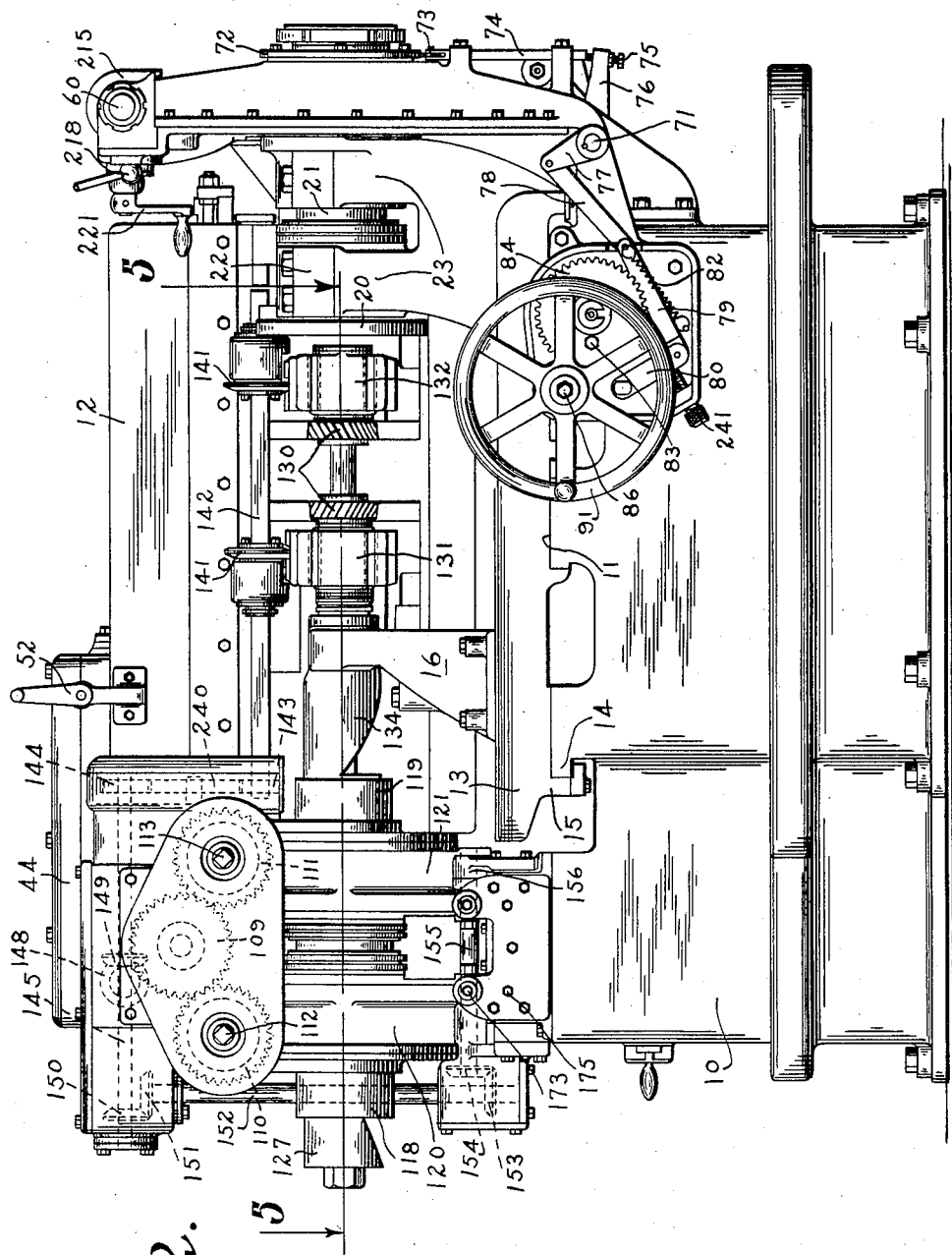
Fig. 2 is a front elevation of the machine shown in Fig. 1.
Figures 3, 21:
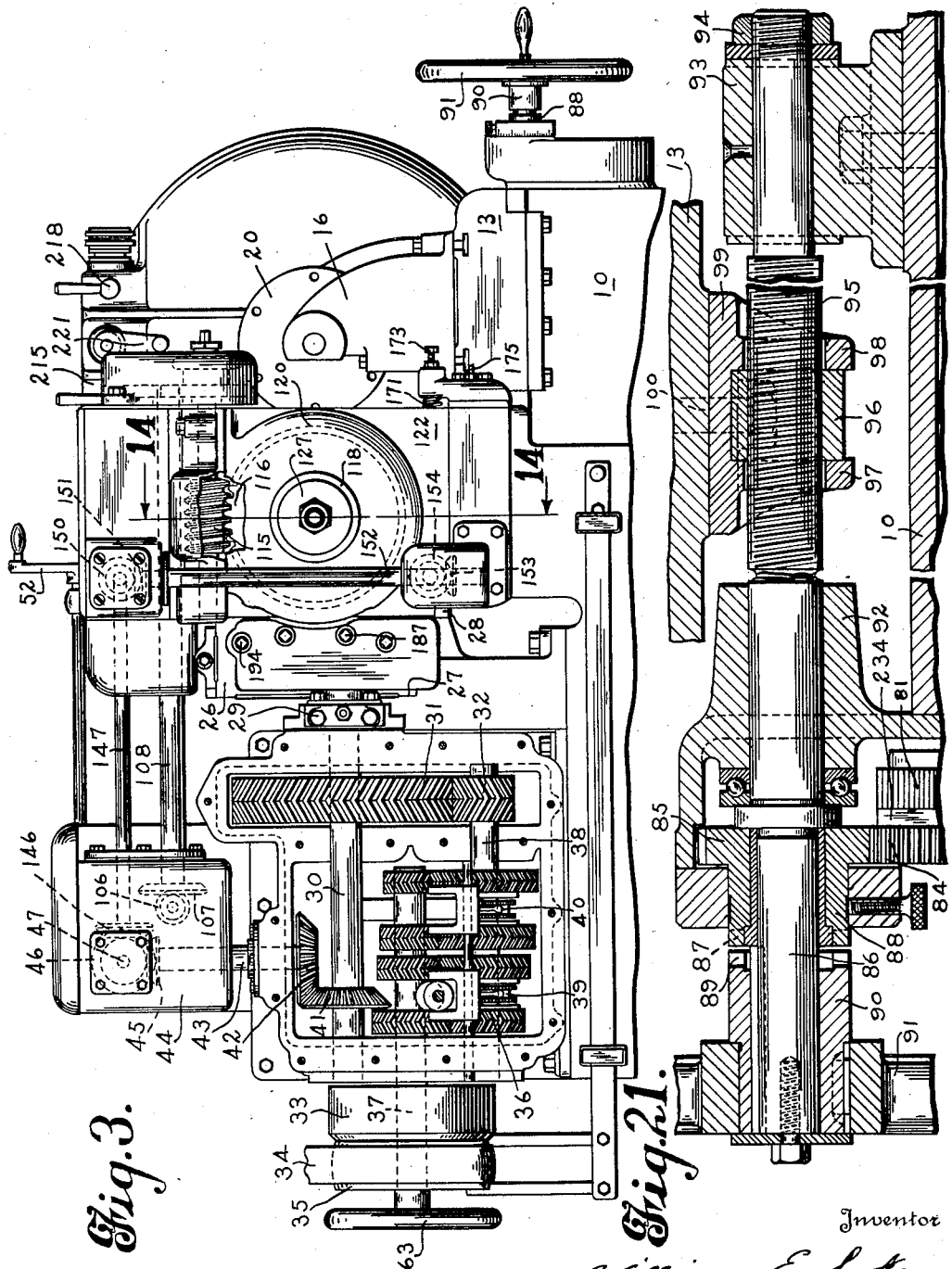
Fig. 3 is a left hand side view of part of the machine.
Fig. 21 is a section on line 21—21 of Fig. 19.

The machine selected to illustrate the features and improvements of this invention is generally shown in Figs. 1 to 4, inclusive. A main base 10 having a flat horizontally disposed surface 11 at its forward portion, and a flat vertically disposed surface 12 at its intermediate portion, is provided. A subbase 13 is slidably mounted upon the surface 11, being guided thereon by the cooperation of the guides 14 on the main base 10, and the guideways 15 on the subbase 13. Suitable means is provided to move the subbase 13 toward and away from the vertically disposed surface 12, and will be subsequently described. A tail stock 16 is slidably mounted upon the subbase 13, and is adapted to support an arbor 17 upon which the blank 18 to be cut is mounted. The arbor 17, in this instance, is secured to or is a part of a face plate 19, which is bolted to a corresponding plate 20, secured to or a part of a shaft 21. The shaft 21 is rotatably supported in bearings 22 located in standards 23, formed with or secured to the subbase 13.

A transversely slidable carriage 26 is mounted in a guideway 27, formed in the vertically disposed surface 12, being retained therein by keeper plates 28. The carriage 26 is reciprocated in its ways by means of a suitable crank shaft mechanism 29, operably connected with a driven shaft 30. The shaft 30 is driven by the intermeshing of gears 31 and 32, gear 32 obtaining rotatable movement from a main tight pulley 33 when the power driven belt 34 is shifted from the loose pulley 35, through the change speed gear mechanism 36. The pulley 33 is secured to the shaft 37 upon which is secured a series of gears of different diameters, and which mesh with corresponding gears loosely rotatable upon a shaft 38. Sliding clutches 39 and 40, operable by means of the handle 40ª, connect the desired combination of the aforesaid gears to the shaft 38, upon which the gear 32 is secured. A hand wheel 63 is secured to the outer end of shaft 37 by which the same may be manually rotated in either direction.

A bevel gear 41 is mounted on shaft 30 and meshes with a bevel gear 42, secured upon the end of a vertical shaft 43, which extends into a gear box 44. A bevel gear 45 is secured to the upper end of shaft 43 and meshes with a bevel gear 46, secured to a shaft 47, which is connected to a shaft 48 by means of a coupling 49. A series of gears of different diameters is mounted upon shaft 48, all of which are in mesh with gears of a cooperating series loosely rotatable upon a shaft 50. Clutch mechanism 51 operable by means of the handle 52 is provided to connect the desired gear to the shaft 50, to impart rotation thereto. Shaft 50 extends into a gear box 53 and has a bevel gear 54 secured to the end thereof within the gear box 53. The bevel gear 54 meshes with the bevel gear 55 on a shaft 56, which extends without the box 53, having a spur gear 57 secured upon its outer end. The gear 57 is one of a set of change gears 57, 58 and 59, which are suitably arranged for the substitution of others in a well known manner, whereby the speed relation between the shaft 56 and a shaft 60, upon which the gear 59 is mounted, may be changed. The shaft 60 extends towards the front of the machine, and a worm 61 is slidably secured to its forward end. The worm 61 meshes with the worm wheel 62, which is secured upon the shaft 21 and by which the blank 18 may be rotated.

A spur gear 64 is secured to the shaft 50 within the box 53 and meshes with the spur gear 65 (see Figs. 1 and 18), secured to a shaft 66. A cam 67 is secured to shaft 66, and is adapted to be engaged by the end of a rod 68. The other end of the rod 68 engages against the end of an adjusting screw 69, located in the outer end of a rocker arm 70, secured to a rock shaft 71. Suitably mounted upon the shaft 21 is a cam 72, the periphery of which is engaged by a roller 73, mounted in the end of a slidable bar 74. The other end of the bar 74 engages the end of an adjusting screw 75, located in the outer end of a rocker arm 76, also secured to the rock shaft 71. Secured to the forward end of the shaft 71 is an arm 77 which by means of the link bars 78 and 79, is connected to an idler rocker arm 80. The arm 80 is engaged by an adjustable stop screw 241. A spring 82 is arranged to place tension upon the rocker arm 77 through the link bar 78 by means of which the adjusting screws 75 and 69 are maintained in engagement with the bar 74 and rod 68, respectively, and the roller 73 and rod 68 are maintained in operable contact with cams 72 and 67, respectively.

The link 79 is provided with a pawl tooth 225 (see Fig. 22), which is adapted to engage the teeth of a ratchet wheel 81, mounted to rotate about a stud shaft 229. Secured by bolts 83 to the ratchet wheel 81 is a spur gear 84 (see Fig. 20), which meshes with a pinion 85. The pinion 85 (see Fig. 21) is loosely rotatable upon a shaft 86, and is provided with clutch teeth 87 upon the outer end of an integral hub 88. The clutch teeth 87 are adapted to be engaged by corresponding clutch teeth 89, formed in the end of a sleeve 90, which is keyed or otherwise secured to a hand wheel 91. The sleeve 90 is slidable upon the shaft 86 to permit the engagement and disengagement of the clutch teeth 89 and 87, as desired, while at the same time being keyed to the shaft 86 to rotate therewith. The shaft 86 has bearings at 92 and 93 upon the main base 10, and is retained against longitudinal movement relatively thereto by means of the nut 94 at the inner end thereof. Intermediate the bearings 92 and 93 the shaft 86 is threaded as at 95.

The threaded portion 95 of the shaft 86 engages the threads of the nut 96, which is mounted between the shoulders 97 and 98 of the block 99, secured to the under surface of the subbase 13 by bolts 100. The rotation of the shaft 86 will move the subbase 13 either toward or away from the vertical surface 12, depending upon the direction of rotation thereof.

A bevel gear 106 is secured to the end of shaft 50 and meshes with a bevel gear 107 secured to one end of a shaft 108, which extends forwardly having upon its forward end a pinion 109. The pinion 109 meshes with pinions 110 and 111, loosely mounted upon shafts 112 and 113 respectively, to which they may be clutched by suitable clutches 114. Upon each of the shafts 112 and 113 is secured a suitable worm 115 which respectively engage worm wheels 116 and 117. The worm wheels 116 and 117 respectively, are provided with hollow hubs 118 and 119, having bearings in casings 120 and 121. The casings 120 and 121 are slidable relatively to the base 10 by the cooperation of the guide portions 122 and 123 thereof, with suitable guideways 124 and 125, respectively.

A helical guide nut 126 is secured within the hub 118 and is engaged by a helical guide 127, secured to a cutter shaft 128, and a similar guide nut 133 is engaged by a helical guide 134 secured to a hollow cutter shaft 129. The shaft 128 passes loosely through shaft 129. A gear shaped cutter 130 is secured to each of the shafts 128 and 129. The shafts 128 and 129 are mounted in cutter shaft supports 131 and 132, respectively. Upon rotation of the worm wheels 116 and 117 through the hubs 118 and 119 and the nuts 126 and 133, the shafts 128 and 129 are rotated by the bevel gear 107 and in synchronism with the rotation of the gear blank shaft 21.

The cutter supports 131 and 132 are slidably mounted upon subsupports 135 and 136 respectively, which are adjustably and slidably secured to the reciprocable carriage 26. Reciprocation of the carriage causes the cutters to pass back and forth over the blank 18 to cut teeth therein, while the helical guides give the cutters the required twist to form a helical path, and a continuous rotation of both the cutters and the blank form or generate the surface of the teeth so cut.

Each of the cutter supports 131 and 132 is provided with a pair of spaced apart rollers 137 and 138 (see Fig. 10), rotatable upon studs 139, retained in place by plates 140. The rollers 137 and 138 are each engaged by a rotary cam 141 rotatably mounted in each of the subsupports 135 and 136. The rotary cams 141 are rotated by a cam shaft 142 which rotatably engages the cams while being adapted to slide axially therethrough, being, in this instance, square shaped in cross section. The cam shaft 142 is rotated by means of the meshing of a pinion 143, secured to one end thereof, an intermediate gear 240 and a pinion 144 secured upon a shaft 145. The shaft 145 obtains rotary motion from the main power supply through a bevel gear 146 which is in mesh with gear 46 in the gear box 44 (see Fig. 1). The gear 146 is secured to a shaft 147 and drives a bevel gear 148, which is secured to this shaft. The gear 148 meshes with a bevel gear 149, secured to shaft 145.

Secured to the shaft 145 is a bevel gear 150, which meshes with the bevel gear 151, secured to the end of a vertical shaft 152, upon the lower end of which is another bevel gear 153. The gear 153 meshes with gear 154 secured to a transversely extending shaft 155. The shaft 155 is journaled at 156 to the base 10 (see Figs. 15 and 16.) Cams 157 and 158 are secured to shaft 155 and rotate therewith. These cams are disposed within an opening 159 in the guide portions 122 and 123 of the casings 120 and 121, respectively, and operatively engage rollers 160 and 161, respectively, which are adjustably secured to the lower guide portions 122 and 123, respectively. The rollers 160 and 161 are adjustable toward and from the respective cams by means comprising a pair of strap members 162 and 163 disposed on either side of both guide portions, and presenting a bifurcated structure adjacent the respective cams. The rollers are pivoted upon a pin 164, extending across the bifurcated structure so formed. A bolt 165 retains the bifurcated portion so formed against spreading. The bolt 165 is disposed within the opening 159 which extends forwardly, as shown at 166. The portions 167 of the bolt 165, which pass through the strap members 162 and 163, are eccentric to the body of the bolt. Another bolt 168 passes through the forward ends of both members 162 and 163, and through the material of the lower guide portions 122 and 123 respectively, to retain the members thereon. The bolt 168 is disposed within an enlarged opening 169, where it passes through the lower portions 122 and 123, which allows relative movement therebetween. By loosening the bolt 168 and rotating the bolt 165, the respective rollers controlled thereby may be adjusted either toward or away from the respective cams engaging the same to adjust the position of the casings 120 and 121 relatively to the base 10, and to modify the action of the cams 157 and 158 thereon.

The cams 157 and 158, in this instance, are of a type that will only urge the casings 120 and 121 in one direction. It is, therefore, necessary to provide means to force the casings in the opposite direction. For this purpose, compression springs 170 and 171 are provided, which engage against the forward ends of the lower guide portions 122 and 123 respectively. Tension adjusting means comprising a disk 172 and screw 173 are provided to properly tension these springs. A shim 174 adjustable by means of a screw 175 is provided below each of the lower guide portions 122 and 123, to insure proper bearing of the upper and lower guide portions within the respective guideways.

Inasmuch as the mechanisms above described relative to the rotary cams 141 and the cams 157 and 158, are geared together, the rotation thereof will be in synchronism, and a positive action will be insured therefrom. The arrangement is such that the casing bearing the worm wheel, which controls one cutter, will be moved rearwardly when that cu ter through its support is reciprocated away from the other cutter. Such an arrangement is desirable in order to prevent the shafts 128 and 129 being distorted when the cutters are moved into their relieved position during the non-cutting stroke thereof.

Figures 5, 6:
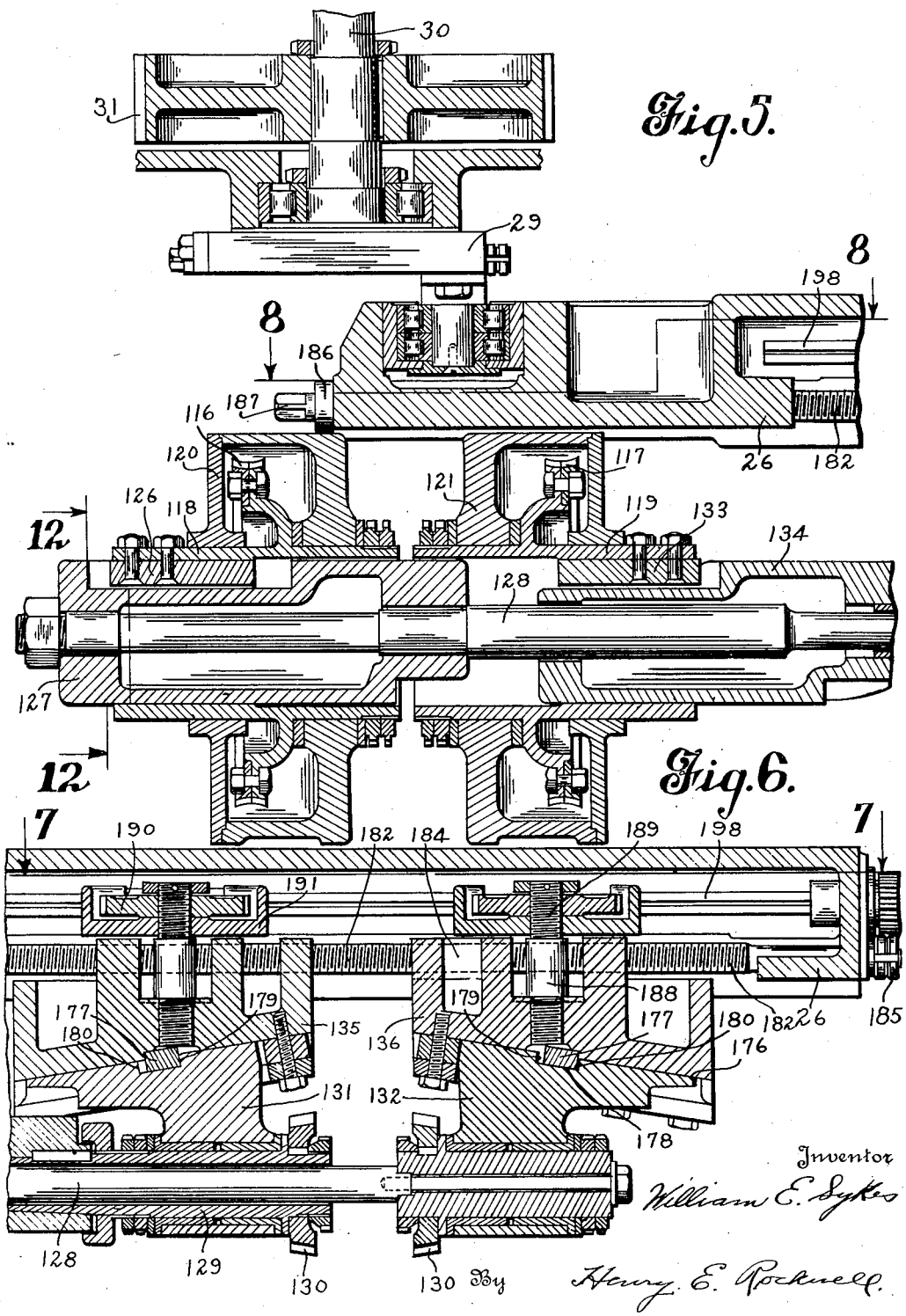
Fig. 5 is a sectional view on line 5—5 of Fig. 2.
Fig. 6 is an extension of the sectional view shown in Fig. 5.
Figure 14:
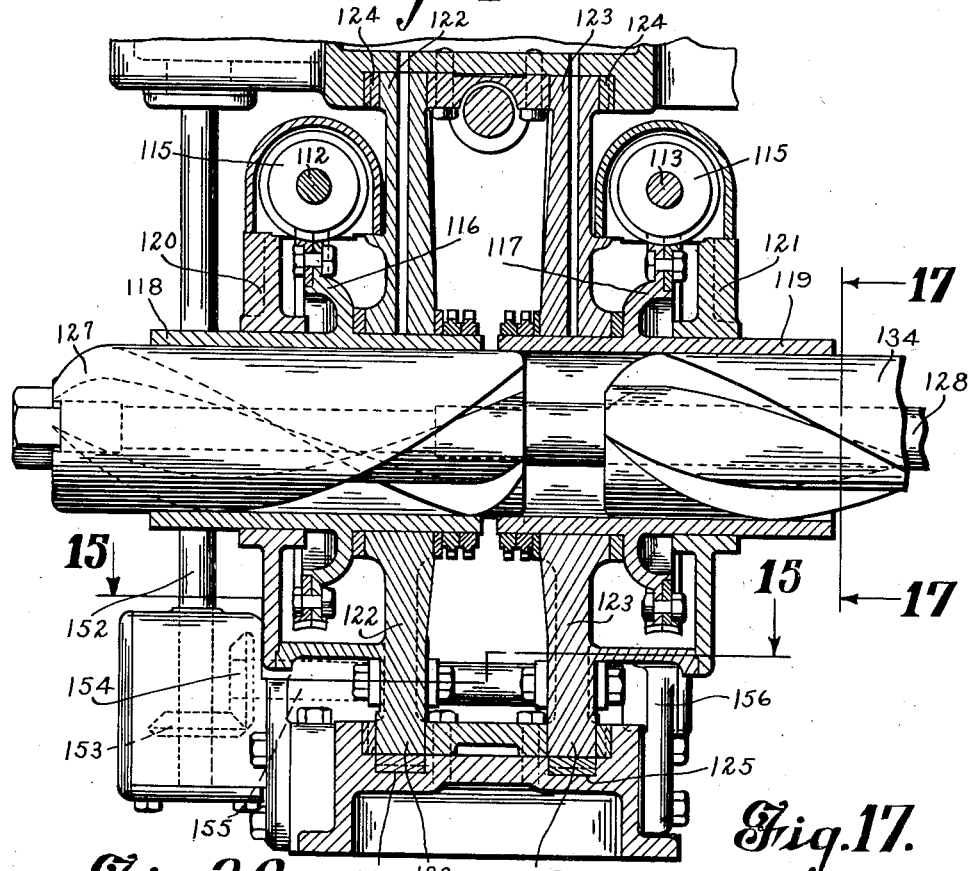
Fig. 14 is a sectional view on line 14—14 of Fig. 3.

The above mentioned cutter relief movement is obtained by the action of cooperating inclined surfaces 176, disposed between the cutter supports 131 and 132, and the subsupports 135 and 136 respectively, (see Fig. 6) in a similar manner as described in the above mentioned application. The means by which the relative movement between the cooperating parts is limited, in this instance comprises the rectangular bar 177 which is secured to the subsupport, and which engages the cutter support within a transverse groove 178. Shoulders 179 and 180 formed by the groove 178 are alternately engaged by the bar 177 to drive the cutter support during the reciprocating movement of the carriage 26, as well as to limit the relative movement between the parts when the respective cams 141 move the supports relatively to the respective subsupports.

As above stated, the subsupports 135 and 136 are slidably and adjustably mounted upon the carriage 26. The adjustable means, in this instance comprises the adjusting screws 181 and 182, which respectively engage the threaded nuts 183 and 184, disposed between lugs extending from the under surface of the sub supports (see Figs. 6, 7, 8 and 9.) The screws 181 and 182 extend the entire length of the carriage 26 being disposed within a hollowed-out rear portion thereof. These screws are rotatably secured at the right hand end of the carriage by nuts 185, and at the left hand end by the collars 186, which are secured to the screws. An extension 187 is formed upon each of the screws to fit a wrench by which these screws may be rotated to move the respective subsupports relatively to the carriage 26.

The subsupports after being adjusted to the desired position upon the carriage, are securely locked or clamped thereto, and to facilitate the clamping thereof means is provided whereby the operator may accomplish this operation while remaining in the same position at which the adjusting of the subsupports upon the carriage is performed. The means for clamping the subsupports to the carriage, comprises a stud 188 which threadingly and securely engages the subsupport at one end, and which has a threaded portion 189 at the other end upon which is mounted a worm wheel 190, having threads in its bore adapted to cooperate with the threads upon the portion 189. A clamping member 191 is engaged by the worm wheel 190 and is forced toward the subsupport when the worm wheel 190 is rotated to cause it to ride upon the threaded portion 189 toward the subsupport. The member 191 engages projecting portions 192, formed upon the carriage 26, and therefore, draws the subsupport into clamped relation therewith against the forward surface 193 of the carriage (see Fig. 9).

The worm wheel 190 is rotated by means of a wrench which may be applied to the extending ends 194 of rods 195, extending from one end of the carriage to the other. A pinion 196 is secured to the remote end of each rod 195 (see Fig. 7), and meshes with a pinion 197 secured upon a shaft 198. A worm 199 is rotatably and slidably mounted upon the shaft 198. The worm 199 is disposed between shoulders 200 and 201 formed by lugs 202, which are integral with the member 191, and is thereby retained against axial movement relatively to the clamping member 191. The worm 199 is in mesh with the worm wheel 190, and by the proper manipulation of the rod 195, by means of a wrench or the like, the clamping members 191 operate to clamp the subsupports to the carriage 26.

The continuous reciprocation of the helical guides 127 and 134 tends to cause wear between the helical groove 203 therein and the guide nuts 126 and 133 respectively. This is especially true in machines of this type, wherein the helical grooves are of a width substantially one-half of the periphery thereof. In the machine embodying the features of this invention, the groove 203 is relatively narrow, which among other things, tends to strengthen the guides and to insure rigidity of its structure. There has also been provided means to adjust the guide nuts relatively to the guides, so as to take up wear and to insure that the bearing therebetween will be tight and rigid. The adjusting means above noted comprises the two part guide nuts 126 and 133, shown in the drawings (see Figs. 5, 12, 13 and 17). Both of these nuts are identical in structure in the following respects, and therefore only one will be described in detail. The two part adjustable guide nut 126 comprises the portion 204 which is firmly secured by means of bolts 205 to the hollow hub 118, and an axially adjustable portion 206, which is slidably secured to the hollow hub 118, by means of bolts 207. The portion 206 is provided with elongated openings 208 through which the bolts 207 pass, and when the same are loosened, the portion 206 may be adjusted axially by means of the adjusting screw 209. The adjusting screw 209 is retained in a stationary position relatively to the hub 118 by means of the member 210, through which it passes and with which it is in threaded engagement. The member 210 is provided with a threaded stud 211 which by the cooperation thereof with a nut 212, clamps the member 210 to the hub 118.

It is occasionally desirable to disconnect the worm wheel 62 from the worm 61 (see Figs. 4, 18 and 19), so that the blank 18 may be rotated manually for inspection, etc. This operation may be accomplished by the manipulation of the following mechanism. The shaft 60, which carries the gear 59 on one end, and the worm 61 upon the other, is provided with a bearing in a swingable bracket 213, mounted upon the gear box 53, upon the stud 214, the stud 214 being secured to the box 53 in any suitable manner. At the worm end, the shaft 60 passes through a bracket 215 and is supported thereby. The bracket 215 is vertically slidable upon a portion of the worm wheel casing 216, which is secured to the subbase 13. A screw 217 limits the downward movement of the worm 61 by engaging the bracket 215, and suitable screw clamps 218 are provided to retain the bracket 215 in any of its adjusted positions. A rotatable stud 220 is provided with an end 219 which is formed eccentric to the body of the stud, and which is adapted to engage the bracket 215 to raise or lower it when the stud is rotated. The stud 220 has a bearing in the worm wheel casing 216 and may be manually operated by a handle 221 secured to the outer end thereof.

The cam 72 is provided with camming surfaces 222, 223 and 224 (see Fig. 4) upon its periphery, which, during the rotation of the worm wheel 62 and likewise the blank 18, controls the automatic means for moving the blank toward the cutters while the cam 67 (see Fig. 18) being rotated by the gear 65 through the shaft 66 operates this means. The cam 72, therefore, is a control cam, and cam 67 the operating cam for the blank feeding mechanism. Operation of the cam 67 upon the shaft 71, and through the arm and links 77, 78 and 79 respectively, causes the pawl tooth 225 to rotate the ratchet wheel 81 by engagement with the teeth thereof. The control cam 72, however, when the camming surface 224 is engaged by the roller 73, holds the shaft 71 and therefore the arm 70 out of operative position and from the influence of the cam 67 by depressing the arm 76, which prevents the pawl tooth 225 from operating the ratchet wheel 81, the movement of the arm 77 and link 79 being arrested. After the cam 72 has rotated to allow the roller 73 to move into engagement with the camming surface 222, the above control is relieved and the cam 67 immediately starts to operate the ratchet wheel 81 through the various arms and links. Being relatively deeply cut into the surface of the periphery of the cam 72, the camming surface 222 allows the roller 73 to rise sufficiently to permit a considerable movement on the part of the arm and link mechanism, which movement causes the pawl tooth 225 to at least skip one tooth in the ratchet wheel and therefore to engage the second tooth from the last one engaged, the purpose of which will be subsequently described. Continued rotation of the cam 72 causes the camming surface 223 to be engaged by the roller 73, whereby the arm 76 is depressed, and through the shaft 71 limits the action of the cam 67 so that only one tooth of the ratchet wheel 81 at a time is engaged by the pawl tooth 225 upon link 79.

The gear 84 is detachably secured to the ratchet wheel 81 by means of the T bolts 83, the heads 227 of which engage the wheel 81 within an annular T-shaped slot 228 in the face thereof. The assembled gear and ratchet wheel are rotatably mounted upon the stud shaft 229, and are secured thereto by a locking collar 230, which has a U-shaped slot 231 therein whereby it may be slipped over a reduced end 232 of the shaft 229 to engage in back of a headed portion 233.

A plurality of dogs 234 are provided for the purpose of assisting in the control of the blank feeding movement. The dogs 234 are adapted to be clamped between the gear 84 and the ratchet wheel 81. A key portion 235 engages in an annular slot 236 formed in the face of the wheel 81, to prevent outward movement thereof, and a portion 237 formed to fit between two of the teeth on the ratchet wheel 81, prevents the peripheral movement thereof relatively thereto. The outer end of these dogs at the portion 237, presents a blank surface coincident with the periphery of the wheel 81 to form an interruption in the series of teeth thereon when the dogs are placed in position between the gear and the wheel. The series of teeth formed on the periphery of the ratchet wheel 81 is interrupted for a distance substantially equal to the peripheral amount of surface required for three teeth to form a blank or toothless portion, as at 238.

The operation of the machine as above described is as follows: Assuming that a gear blank 18 to be cut has been provided and is mounted upon the arbor 17, that the proper cutters have been mounted and adjusted relatively to the blank by the adjusting means above described regarding the subsupports 135 and 136, and that power is applied to the pulley 33 through the driven belt 34, the proper gear relations are determined for the entire machine and the necessary clutches in the various gear boxes are manipulated to connect the mechanisms to the power supply.

The blank 18 is manually set in a position whereby the cutters while being reciprocated across the same, will just clear the periphery thereof. The cutters reciprocate with the carriage, and at the completion of each stroke are drawn away from the blank by the action of the inclined cooperating surfaces 176, due to the positive action of the rotary cams 141 upon the cutter supports 131 and 132 respectively, which at the moment of reversal of the carriage reciprocating movement are so timed that the cutter support with the cutter will be abruptly shifted in the same direction as that taken by the carriage. This movement slides the cutter support upon the subsupport and down the incline forcing the cutter away from the blank and retaining it in such position, thus relieving it during its non-cutting stroke. A reversal of this operation automatically takes place at the next reversal of the carriage movement, and the cutter is moved abruptly toward the work and retained in operative position during the cutting stroke by the action of the cam 141. At the same time, the corresponding worm wheel and casing therefor are shifted by the release of the cam from engagement with the lower guide and the action of the spring 170 thereon. In this manner the shafts 128 and 129 are prevented from possible bending or other distortion.

The cutters and blank will now be in readiness for the start of the cutting operation. The cutters will be reciprocated across the blank 18 by the carriage 26, and alternately relieved and positioned, given a twisting action by the helical guide so that each cutting tooth is describing a helical path across the blank, or as far as the center in instances of double helical gear cutting, or in instances where straight teeth are being cut the cutters will not be twisted but be under the guidance of straight guides and therefore guided in a straight path across the blank, and the cutters and blank are rotating together in an action similar to a pair of meshed gears so as to form or generate the proper tooth outline.

The blank feeding mechanism having been properly adjusted as hereinafter described, is clutched in by the cooperation of the clutch teeth 87 and 89 and the subbase 13 with the parts carried thereby will move toward the vertically disposed surface 12, carrying the blank 18 toward the cutters. During that portion of one revolution of the blank 18 and control cam 72, while the roller 73 is engaged by the camming surface 224, no feeding of the blank toward the cutters will take place as the ratchet wheel 81 will not be rotated by the action of the pawl tooth 225, but during the remaining portion of the revolution a continuous step by step feed will be obtained. Inasmuch as a continuous feed of the blank toward the cutter during this interval would be excessive, an interruption and proportioning thereof is necessary. This interruption and proportioning of the feed for the blank is accomplished by the use of a predetermined number of dogs 234 placed at intervals about the ratchet wheel 81.

Figure 22:
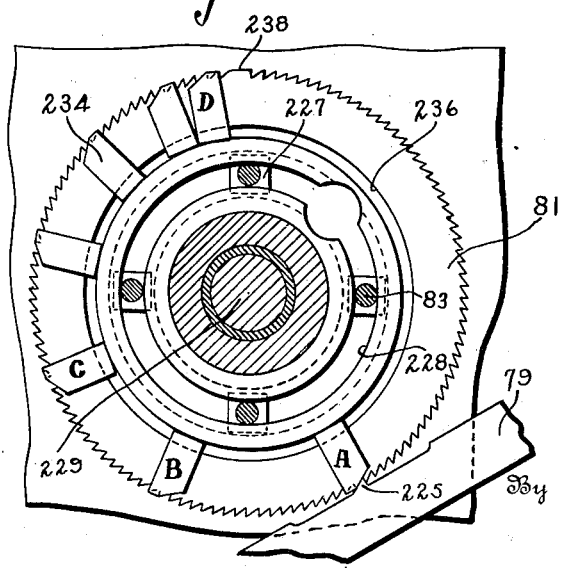
Fig. 22 is a section on line 22—22 of Fig. 20.
Figure 17:
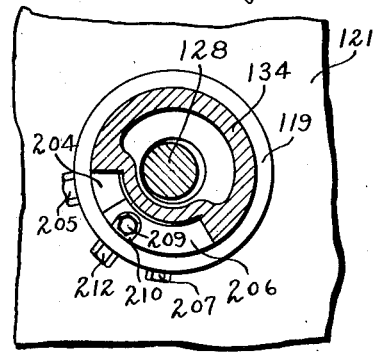
Fig. 17 is a sectional view on line 17—17 of Fig. 14.

Referring to Figs. 4 and 22, the ratchet wheel 81 is set with relation to the pawl tooth 225 so that this tooth, for instance, is upon the interruption formed by the dog 234 at A, Fig. 22. This point is the zero point for the ratchet wheel. The control cam 72 (see Fig. 4) at this time is adjusted to a position whereby the roller 73 will be in engagement with the camming surface 222, whereby the cam 67 will give the pawl 225 an extra long throw, carrying it into the first tooth of the ratchet wheel in advance of dog 234 at A. The ratchet wheel will, therefore, be rotated by the pawl tooth 225 under the action of cam 67, at this time being controlled by the cam 72, the roller 73 having come into engagement with the camming surface 223, permitting the engagement of tooth 225 with only one tooth of the ratchet wheel 81 at a time. This movement feeds the blank toward the cutters and will continue until the tooth 225 rides up on the interruption in the ratchet teeth formed by the second dog 234 at B.

Although the cam 67 is still in operation and the links and arms connected therewith continue to move until the roller 73 engages the camming surface 224, the feed of the blank toward the cutter is arrested inasmuch as the tooth 225 can only be advanced one tooth on the ratchet wheel 81 at a time, by the cam 67, during the interval that the roller 73 is engaging the camming surface 223. During this period, teeth are being cut in the blank 18 over its remaining periphery at a depth corresponding to the amount of feed given to it before the interruption of the dog 234 at B. As soon as the control cam 72 completes a revolution, the roller 73 drops into engagement with the camming surface 222, thereby allowing the cam 67 to operate the pawl tooth 225 and advance it sufficiently to engage with the teeth of the ratchet wheel 81 beyond the dog 234 at B. The blank is then again fed toward the cutters during the interval proportional to the distance between the dogs 234 at B and C. Another complete revolution of the blank is completed after this feed, which is interrupted at C, and so on until the last dog 234 at D is reached. The feed, after this point is reached, is slight, very soon being interrupted by the blank or toothless portion 238 on the ratchet wheel 81, which being of extended peripheral length prevents further feed by not allowing the operations permitted by the engagement of the roller 73 with the camming surface 222, inasmuch as the throw of the pawl tooth 225 obtained from the cam 67 is not sufficient to cause it to engage the ratchet tooth beyond the portion 238. By proper arrangement of the dogs 234 about the ratchet wheel 81 teeth may be properly, efficiently and automatically cut upon the periphery of a blank 18.

To further illustrate the above feeding action, we will assume that the ratio of gears 84 and 85 is 2.4:1, and the pitch of the threads on shaft 86 is .250 inches. Therefore, a complete revolution of gear 84 will give a depth of cut or an amount of advance of the blank toward the cutters of .600 inches. The ratchet wheel 81, in this instance, is graduated with 600 divisions and has 120 ratchet teeth. Therefore, each tooth would give .005 inches feed. If we require a total depth of .340 and decide to make the following cuts—.090, .070, .060, .050, .040, .020 and .010, the last dog 234 at D would be set two teeth from the blank position 238 on the ratchet wheel 81, the next dog four teeth from this, then eight teeth, and so on. This setting operation is preferably made when the gear 84 and ratchet wheel 81 are removed from the stud 229. The machine will now feed the blank toward the cutters .090 and the remaining cuts follow in sequence after each revolution of the work until the blank space 238 on the ratchet wheel 81 prevents any further feed.

While I have shown and described a preferred embodiment of my invention, it will be understood that it is not to be limited to all the details shown, but is capable of modification and variation within the spirit of the invention and the scope of the appended claims.

What I claim is:

1. In a gear cutting machine, a frame, a carriage reciprocably mounted thereon, a clamp shaft carried by said carriage, said shaft extending in the direction of the reciprocating movement of said carriage, cutter supports adjustably mounted upon said carriage for adjustments in directions parallel to the direction of the reciprocating movement of said carriage, and means to secure said supports to said carriage and operable from a position remote from said supports by said clamp shaft.

2. In a gear cutting machine, a frame, a carriage reciprocably mounted thereon, a clamp shaft carried by said carriage, said shaft being disposed parallel with the direction of the reciprocating movement of said carriage, cutter supports adjustably mounted upon said carriage for adjustment in directions parallel to the direction of the reciprocating movement of said carriage, and means to secure said supports to said carriage including gearing operable at a position remote from said supports by said clamp shaft.

3. In a gear cutting machine, a frame, a carriage reciprocably mounted thereon for movements parallel with the face of the gear blank, cutter supports slidably mounted upon said carriage for movements parallel with the reciprocating movement of said carriage, means to secure said supports to said carriage, and means to adjust the supports relatively to the carriage in directions parallel to the reciprocating movement of said carriage, said securing means and said adjusting means being operable from a position remote from said supports.

4. In a gear cutting machine, a frame, a carriage reciprocably mounted thereon, means engaging one end of said carriage to reciprocate the same, cutter supports slidably mounted upon said carriage, means to secure said supports to said carriage in any position thereon, and means to adjust the supports relatively to the carriage, said securing means and said adjusting means being operable at a position common to both, remote from said supports and adjacent the end of said carriage engaged by said reciprocating means.

5. In a gear cutting machine, a frame, a carriage reciprocably mounted thereon, a cutter support slidably mounted upon said carriage, means to secure said support to said carriage, comprising a clamp screw fixed to said support against sliding and rotating movement relatively thereto, and a rotatable nut carried by said support cooperating with said clamp screw, and means carried by said carriage to rotate said rotatable nut from a position remote therefrom to clamp said support to said carriage.

6. In a gear cutting machine, a frame, a carriage reciprocably mounted thereon, means engaging one end of said carriage to reciprocate the same, a cutter support slidably mounted upon said carriage, means to secure said support to said carriage, comprising a clamp screw fixedly secured to said support and a rotatable nut carried by said support cooperating with said clamp screw, a rotatable shaft carried by said carriage and extending from said nut to the end of said carriage engaged by said reciprocating means, and connecting mechanism between said shaft and said nut whereby said nut is rotatable thereby from said end of said carriage.

7. In a gear cutting machine of the type described, cutter twisting mechanism including a sleeve-like part of said machine, a member having a helical groove therein and adapted to slide through the sleeve-like part of said machine, and a guide nut cooperating with said member within said groove, said guide nut being secured to said sleeve-like part and being adjustable relatively to the width of said groove to insure proper bearing therein.

8. In a gear cutting machine of the type described, cutter twisting mechanism including a sleeve-like part of said machine, a member having a helical groove therein and adapted to slide through the sleeve-like part of said machine, and a guide nut cooperating with said member within said groove, said guide nut comprising a portion secured to said sleeve-like part, and another portion slidable relatively to the first portion and to said sleeve-like part to adjust the width of said nut relatively to the width of said groove to insure proper bearing therein.

9. In a gear cutting machine of the type described, cutter twisting mechanism including a sleeve-like part of said machine, a member having a helical groove therein and adapted to slide through the sleeve-like part of said machine, and a guide nut cooperating with said member within said groove, said guide nut comprising a portion secured to said sleeve-like part, and another portion slidable relatively to the first portion and to said sleeve-like part, and means to slide said second portion relatively to the first portion to adjust the width of said nut relatively to the width of said groove, said means being secured to said sleeve-like part of said machine.

10. In a gear cutting machine of the type described, cutter twisting mechanism including a sleeve-like part of said machine, a member having a helical groove therein and adapted to slide through the sleeve-like part of said machine, and a guide nut cooperating with said member within said groove, said guide nut comprising a pair of members movable relatively to each other and having cooperating surfaces, the surface on one of said members being inclined, and means to move one of said nut members relatively to the other to adjust the overall width of said nut whereby a proper bearing thereof within said groove is obtained.

11. A machine of the type described comprising a frame, a blank support, a reciprocable slide on said frame, a cutter support, means for mounting the cutter support on said slide including an inclined surface, and means to move the cutter support relatively to said slide upon said inclined surface including a continuously rotatable cam.

12. A machine of the type described comprising a frame, a blank support, a reciprocable slide on said frame, a cutter support, means for mounting the cutter support on said slide including an inclined surface, and means to move the cutter support relatively to said slide upon said inclined surface including a continuously rotatable cam, and means to limit the movement of said support upon said inclined surface.

13. A machine of the type described comprising a frame, a blank support, a reciprocable slide on said frame, a cutter support, means for mounting the cutter support on said slide including a pair of cooperating surfaces, one of which is inclined, means to move the cutter support relatively to said slide, and means interposed between said cooperating surfaces to limit the movement of said support.

14. A machine of the type described comprising a frame, a blank support, a reciprocable slide on said frame, a cutter support, means for mounting the cutter support on said slide including a pair of cooperating surfaces, one of which is inclined, means to move the cutter support relatively to said slide including a continuously rotatable cam, and means interposed between said cooperating surfaces to limit the movement of said support.

15. A machine of the type described comprising a frame, a blank support, a reciprocable slide on said frame, a cutter support, means for mounting the cutter support on said slide including a pair of cooperating surfaces, one of which is inclined, one of said surfaces having a slot and the other a stop member cooperating with said slot to limit the movement of said support, and means to move the cutter support relatively to said slide.

16. A machine of the type described comprising a frame, a blank support, a reciprocable slide on said frame, a cutter support, means for mounting the cutter support on said slide including a pair of cooperating surfaces, one of which is inclined, means to move the cutter support relatively to said slide, including a continuously rotatable cam, one of said surfaces having a slot and the other a stop member cooperating with said slot to limit the movement of said support.

17. A machine of the type described comprising a frame, a blank support, a cutter having a shaft, means for supporting said shaft at both ends thereof to said frame, and means acting against the shaft supporting means at both ends thereof to move it toward and away from said frame, each of said means including a continuously rotatable cam.

18. In a gear cutting machine, a cutter shaft having rotating means associated therewith, a support for said shaft, said shaft and said shaft support being adapted for axial movement relatively to said shaft, and said shaft rotating means being slidable transversely to the axis of said shaft, and means including a continuously rotatable cam for causing axial movement of said shaft support and the transverse movement of said shaft rotating means.

19. In a gear cutting machine, a cutter shaft having rotating means associated therewith, a support for said shaft, said shaft and said shaft support being adapted for axial movement relatively to said shaft, and said shaft rotating means being slidable transversely to the axis of said shaft, means to convert the axial movement of said shaft and said shaft support into transverse movement relatively to the axis of said shaft, and means including a continuously rotatable cam for causing the axial movement of said shaft support, and the transverse movement of said shaft rotating means.

20. In a gear cutting machine, a cutter, a work support, and automatically operable work support moving means to feed said work support toward said cutter in gradually diminishing steps, said means being variable to vary the amount of each step.

21. In a gear cutting machine, a cutter, a rotatable work support, and work support moving means to feed said work support towards said cutter in steps of gradually diminishing amounts at each revolution of said work support, said means being variable to vary the amount of each step.

22. In a gear cutting machine, a rotatable cutter, a rotatable work support, and work support moving means to feed said work support towards said cutter in a series of unequal steps during a predetermined number of revolutions of one of said parts, said means being variable to vary the amount of each step.

23. In a gear cutting machine, a cutter, a rotatable work support, and work support moving means to feed said work support towards said cutter during a predetermined number of revolutions thereof in steps of gradually diminishing amounts, said means being variable to vary the amount of each step.

24. In a gear cutting machine, a cutter, a rotatable work support, and work support moving means to feed said work support towards said cutter, during a predetermined number of revolutions thereof in steps of gradually diminishing amounts, each step in the feed being operable during an interval of each revolution of said work support and means to vary the amount of each step.

25. In a gear cutting machine, a cutter, and a work support, one being slidable relatively to the other, means for moving the slidable one, continuously operating means to operate said moving means, means to control the action of said operating means, and means to interrupt the movement of said moving means.

26. In a gear cutting machine, a base, a rotatable work support slidably mounted upon said base, and means to slide said support relatively to said base in a series of interrupted steps, each step being in operation during a part of one revolution of said work support.

27. In a gear cutting machine, a cutter, a rotatable work support, means to cause a step by step feed of said work support toward said cutter, an operating cam for said feeding means, and a control cam rotatable with said work support for controlling the action of said operating cam.

28. In a gear cutting machine, a rotatable cutter, a rotatable work support, power driven means to feed said work support toward said cutter, operating means for said feeding means, control means for controlling the action of said operating means, common driving means for said cutter, said work support, said feeding means, said operating means and said controlling means and manually operable means for feeding said work support.

29. In a gear cutting machine, a cutter, a rotatable work support, means to continuously feed said work support toward said cutter, means to feed said work support toward said cutter in a series of unequal steps, operating means for said feeding means, and control means for controlling the action of said operating means.

30. In a gear cutting machine, a cutter, a rotatable work support, manually operable means for continuously feeding said work support toward said cutter, power driven means to intermittently feed said work support toward said cutter in a series of unequal steps, operating means for said power feeding means, and control means for controlling the action of said operating means.

31. In a gear cutting machine of the type described, cutter control mechanism including a sleeve-like part of said machine, a member having a groove therein and adapted to slide through the sleeve-like part of said machine, and a guide nut cooperating with said member within said groove, said guide nut being secured to said sleeve-like part and being adjustable relatively to the width of said groove to insure proper bearing therein.

32. A machine of the type described comprising a frame, a blank support, a reciprocable slide on said frame, a cutter support, means for mounting the cutter support on said slide including an inclined surface, and means to move the cutter support relatively to said slide upon said inclined surface including a cam rotatable through a complete revolution.

33. In a gear cutting machine, a cutter, a rotatable work support, and power driven means to feed said work support towards said cutter in a series of unequal steps during a series of revolutions of said work support.

34. In a gear cutting machine, a rotatable cutter, a rotatable work support, means to rotate said cutter and said work support in synchronism and means to feed said work support towards said cutter in a series of unequal steps during each revolution of a series of revolutions of said work support.

35. In a gear cutting machine, a rotatable cutter support, a rotatable work support, and power driven means to feed said supports toward each other in a series of unequal steps during each revolution of a series of revolutions of one of said supports.

36. The method of cutting teeth in a gear blank, which comprises rotating the blank, applying a cutter to the material of the blank and reciprocating it across the face thereof, feeding the blank toward the cutter in a series of steps during a series of revolutions of the blank, interrupting the feed after a predetermined number of blank revolutions, and permitting the cutter to continue its cutting operation upon the blank while preventing further feed-in of the latter.

37. The method of cutting teeth in a gear blank, which comprises rotating the blank, applying a cutter to the material of the blank, rotating the cutter in synchronism with the rotation of the blank and reciprocating it across the face thereof, feeding the blank toward the cutter in a series of unequal steps during a series of revolutions of the blank, interrupting the feed after a predetermined number of blank revolutions and permitting the cutter to continue its cutting operation upon the blank while preventing further feed-in of the latter.

38. The method of cutting teeth in a gear blank, which comprises rotating the blank, applying a cutter to the material of the blank, rotating the cutter in synchronism with the rotation of the blank, twisting the cutter to form a helical cut while reciprocating it across the face of the blank, intermittently feeding the blank toward the cutter in a series of unequal steps during a series of revolutions of the blank, interrupting the feed after a predetermined number of blank revolutions, and permitting the cutter to continue its cutting operation upon the blank while preventing further feed-in of the latter.

39. In a metal working machine wherein a cutter is reciprocated across the face of a rotatable work blank, a rotatable work support slidably mounted upon a base for movement toward and away from said cutter, means to rotate said work support, and means to move said work support toward said cutter, said last named means comprising a feed screw rotatably operated by a ratchet wheel, and means to intermittently drive said ratchet wheel including a cam rotating in synchronism with said work supporting rotating means.

40. In a metal working machine, a cutter support, a work support, power actuated means to produce a sliding movement of one support relatively to the other in a series of unequal steps during the cutting operation, to compensate for a variation in the area of the cut being taken and means to vary the amount of each step.

41. In a metal working machine having a cutter adapted to remove material from work suitably supported in said machine, automatically operable means to cause a relative movement of said cutter and work toward each other in gradually diminishing steps and means to vary the amount of each step.

42. In a metal working machine having a cutter adapted to remove material from work suitably supported in said machine, automatically operable means to cause a relative movement of said cutter and work toward each other to cause said cutter to remove material from said work in substantially continuously equal amounts, including means to control said automatically operable means whereby the movement caused thereby will be in gradually diminishing steps.

43. In a gear cutting machine, a cutter adapted to enter a gear blank to cut teeth therein, a cutter support, a gear blank support, means to produce a feeding movement of one support relatively toward the other whereby said cutter will enter the gear blank in a series of unequal steps to compensate for the increase in area of the cut being taken.

44. In a metal working machine, a cutter adapted to remove material from work held in said machine in a series of cuts, means to feed said cutter and work relatively toward one another to cause the removal of substantially equal amounts of material from said work at each cut, said means including automatic means to decrease the amount of said feed to compensate for the increase in surface area engaged by said cutter.

45. In a metal working machine, a cutter adapted to remove material from work mounted in said machine, means to feed one of said cutter and work, relatively toward the other to cause the cutting edge of said cutter to engage said work over gradually increasing areas, and automatically operable means to decrease the aforesaid feeding movement between said cutter and work to cause a continuously substantially equal amount of material to be removed from the work.

46. In a metal working machine wherein the work is rotatably supported, and a cutter is adapted to be moved along the work axially thereof, means to rotate said work, and means to cause a relative movement between said cutter and said work toward each other to increase the amount of work surface engaged by said cutter, and including automatically operable means to gradually diminish the speed of the relative movement therebetween.

47. In a metal working machine wherein the work is rotatably supported, and a cutter is adapted to be moved along the work axially thereof, means to rotate said work, means to gradually feed said cutter relatively toward said work to obtain the desired depth of cut while said work is rotating, and including means to gradually decrease the speed of such feeding to compensate for the increased surface being engaged by said cutter.

48. The method of removing material from a work blank which comprises rotating the blank, applying a cutter to the blank, feeding the cutter and blank relatively toward each other to increase the depth of cut, and gradually diminishing the amount of the aforesaid feeding movement to compensate for the increased area being engaged by said cutter due to the increase in depth of cut.

49. In a metal working machine wherein a cutter is moved across the face of a rotatable work blank, a rotatable work support slidably mounted upon a base for movement toward and away from said cutter, means to rotate the work on said work support, and means to move said work support toward said cutter, said last named means comprising a feed screw rotatably operated by a ratchet wheel, and means to intermittently drive said ratchet wheel in synchronism and in unison with said work rotating means.

50. In a metal working machine wherein the work is rotated in synchronism with the movement of the tool, work rotating means comprising a worm wheel, a worm adapted to mesh with said worm wheel, a drive shaft upon which said worm is mounted, said shaft being pivotally supported at one end thereof to said machine, and means to move said shaft about its pivot to permit said worm to mesh and unmesh with said worm wheel.

51. In a metal working machine, a frame, a work support, a carriage reciprocably mounted upon said frame for movement across the work in said work support parallel with the axis thereof, a cutter support mounted upon said carriage, said cutter support being slidably secured to said carriage with the rear face thereof resting against the front face of said carriage and movable thereon in directions parallel to the axis of the work, means to clamp said cutter support and said carriage together at the engaged faces thereof, comprising a threaded member fixedly secured to said cutter support and extending rearwardly therefrom substantially at right angles to the axis of the work and through an opening in said carriage, a rotatable member carried by said carriage and threadingly engaging said threaded member, said rotatable member being adapted to act against said carriage at the rear thereof when rotated to thread upon said threaded member to clamp said cutter support to said carriage, and means to rotate said rotatable member.

52. In a gear cutting machine, a frame, a carriage reciprocably mounted thereon for movement parallel with the face of the gear blank, cutter supports slidably mounted upon said carriage for movement parallel with the reciprocating movement of said carriage, means to secure said supports to said carriage, and means to adjust the supports relatively to the carriage in directions parallel to the reciprocating movement of said carriage, said securing means and said adjusting means being disposed and operable at a position on said machine substantially common to both.

53. In a machine of the type described, a frame, a reciprocable member on said frame, a cutter mounted on said reciprocable member for movement toward and away from the frame, and means to so move said cutter, including an inclined surfaced member and a continuously rotatable cam member in co-operating engagement therewith.

54. A machine of the type described comprising a frame, a blank support, a cutter having a shaft, means for supporting said shaft at both ends thereof to said frame, and means including a continuously rotatable cam acting against the shaft supporting means at each end thereof to move it toward and away from said frame, and means to rotate said cams in synchronism.

55. A machine of the type described, comprising a frame, a blank support, a cutter having a shaft, means for supporting said shaft on said frame, and a continuously rotatable cam mounted on said frame with its axis parallel to the axis of said shaft, and acting against said shaft to move it bodily toward and away from said frame.

56. In a gear cutting machine, a cutter, a rotatable work support, means to cause a step by step feed of said work support toward said cutter. including a rotatable cam member for causing movement of said work support, and control means for said cam member operable with said rotatable work support.

57. In a gear cutting machine, a cutter, a rotatable work support, means to cause a step by step feed of said work support toward said cutter, including a rotatable cam member for causing movement of said work support, and rotatable control means for said cam member rotatable with said work support.

58. In a gear cutting machine, a base, a rotatable work support slidably mounted upon said base, and means to slide said support relatively to said base in a series of interrupted steps, each step being in operation during a part of one revolution of said work support, and means to interrupt the action of said feeding means at the completion of the series of steps.

59. In a gear cutting machine, a base, a work support and a tool support mounted upon said base for relative movement toward and away from each other, one of said supports being rotatable, and means to effect the relative movement between said supports in a series of interrupted steps, each step being in operation a part of one revolution of the rotatable support.

60. In a gear cutting machine, a rotatable cutter, a rotatable work support, means to rotate said cutter and said work support in synchronism, and means to feed said supports toward each other in a series of interrupted steps, each step being in operation during a part of one revolution of one of said supports.

61. The method of cutting teeth in a gear blank, which comprises rotating the blank, applying a cutter to the material of the blank and reciprocating it across the face thereof, feeding the blank toward the cutter in a series of steps during a series of revolutions of the blank and interrupting and preventing further feed after a predetermined number of blank revolutions.

62. The method of cutting teeth in a gear blank, which comprises causing relative rotation between a cutter and a gear blank, causing relative axial movement of a cutter and a gear blank to reciprocate one across the face of the other, causing relative feeding movement of the cutter and the gear blank toward each other in a series of steps during a series of revolutions of the rotating one, and then interrupting and preventing further feed after a predetermined number of revolutions of the rotating one.

63. In a gear cutting machine, work rotating means, means to reciprocate a cutting tool across the face of the work in syncronism with the rotation thereof, means to manually operate said work rotating means, gearing connecting said work rotating means and said cutting tool reciprocating means, said gearing including a worm and a worm wheel, and means to move said worm substantially radially with respect to said worm wheel to unmesh it therewith to permit manual operation of said work rotating means without operating said cutting tool reciprocating means.

64. In a gear cutting machine, work rotating means, means to reciprocate a cutting tool across the face of the work in synchronism with the rotation thereof, means to manually operate said work rotating means, gearing connecting said work rotating means and said cutting tool reciprocating means, said gearing including a worm and a worm wheel, a worm supporting bracket slidably mounted on said machine, and means to slide said bracket to move said worm substantially radially with respect to said worm wheel to unmesh it therewith to permit manual operation of said work rotating means without operating said cutting tool reciprocating means.

65. In a metal working machine wherein a part reciprocates relatively to another part, one of said parts being disposed within an axially directed opening in the other part, one of said parts having an axially directed groove therein and the other part having means secured thereto and projecting into the aforesaid groove, and means to adjust the width of the projecting means to insure proper bearing thereof in the groove, including cooperating surfaces inclined with respect to the longitudinal direction assumed by the groove.

66. In a metal working machine wherein a part reciprocates relatively to another part, one of said parts being disposed within an axially directed opening in the other part, one of said parts having an axially directed groove therein, and the other part having means secured thereto and projecting into the aforesaid groove, said projecting means being adjustable relatively to the width of the groove to insure proper bearing therein.

67. In a metal working machine wherein a part reciprocates relatively to another part, one of said parts being disposed within an axially directed opening in the other part, one of said parts having an axially directed groove therein, and the other part having means secured thereto and projecting into the aforesaid groove, said projecting means comprising a pair of members disposed side by side with their remote side edges in engagement with the sides of the groove, and means to adjust said members relatively to each other and to the width of said groove to insure proper bearing therein.

68. In a gear cutting machine of the type described, cutter control mechanism including a sleeve-like part of said machine, a member having a groove therein and adapted to slide through the sleeve-like part of said machine, and a guide nut cooperating with said member within said groove, said guide nut being transversely expandable to insure proper bearing thereof in the groove.

In witness whereof, I have hereunto set my hand this 25th day of January, 1927.

WILLIAM E. SYKES.